United States Patent [19]
Jakovski et al.

[11] Patent Number: 5,788,269
[45] Date of Patent: Aug. 4, 1998

[54] INFLATOR GAS DIFFUSER AND AIR CUSHION RETAINER

[75] Inventors: Jovica John Jakovski, Warren; Timothy W. Hill, Sterling Heights; Philip A. Shishmian, Clarkston; Gerald M. Fowler, Troy, all of Mich.

[73] Assignee: AlliedSignal Inc., Morristown, N.J.

[21] Appl. No.: 803,966

[22] Filed: Feb. 21, 1997

[51] Int. Cl.⁶ .................................................. B60R 21/20
[52] U.S. Cl. .................. 280/728.2; 280/732; 280/743.1; 280/740
[58] Field of Search ............... 280/728.2, 743.1, 280/732, 728.1, 740

[56] References Cited

U.S. PATENT DOCUMENTS

| 5,186,492 | 2/1993 | Wright et al. | 280/743.1 |
| 5,310,213 | 5/1994 | Mori | 280/732 X |
| 5,470,105 | 11/1995 | Rose et al. | 280/740 |
| 5,490,690 | 2/1996 | Mihm | 280/728.2 |
| 5,605,347 | 2/1997 | Karlow et al. | 280/728.2 |
| 5,607,179 | 3/1997 | Lenart et al. | 280/728.2 |
| 5,613,700 | 3/1997 | Hiramitsu | 280/728.2 |
| 5,639,112 | 6/1997 | Phillion et al. | 280/728.2 |
| 5,658,008 | 8/1997 | Herrmann et al. | 280/728.2 |

*Primary Examiner*—Christopher P. Ellis
*Attorney, Agent, or Firm*—Markell Seitzman

[57] ABSTRACT

A diffuser-retainer, incorporated in a sub-assembly (cushion pack) of an air bag module for the use in an inflatable air bag restraint system. The diffuser-retainer functions as an inflation gas diffuser and an air cushion retainer.

10 Claims, 11 Drawing Sheets

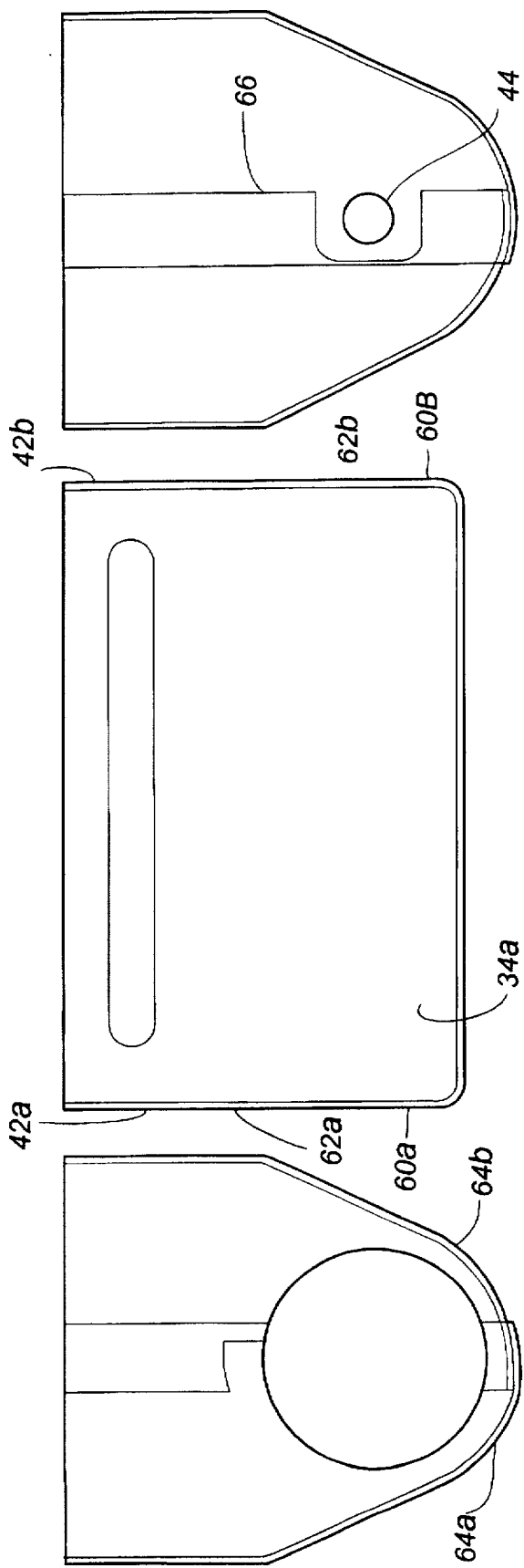

INFLATOR GAS DIFFUSER AND AIR CUSHION RETAINER

BACKGROUND AND SUMMARY OF THE INVENTION

The present invention generally relates to air bag modules and more particularly to a passenger side air bag module.

Many other objects and purposes of the invention will be clear from the following detailed description of the drawings.

BRIEF DESCRIPTION OF THE DRAWINGS

In the drawings:

FIGS. 5a–5c illustrate a left plan, top plan, and right plan view of an assembled housing.

FIG. 7a illustrates a left end plan view, FIG. 7b a cross-sectional view through section 7b of FIG. 7d, FIG. 7c illustrates a right end plan view, FIG. 7d illustrates a top plan view and FIG. 7e is an isometric view.

DETAILED DESCRIPTION OF THE DRAWINGS

Figure 1:
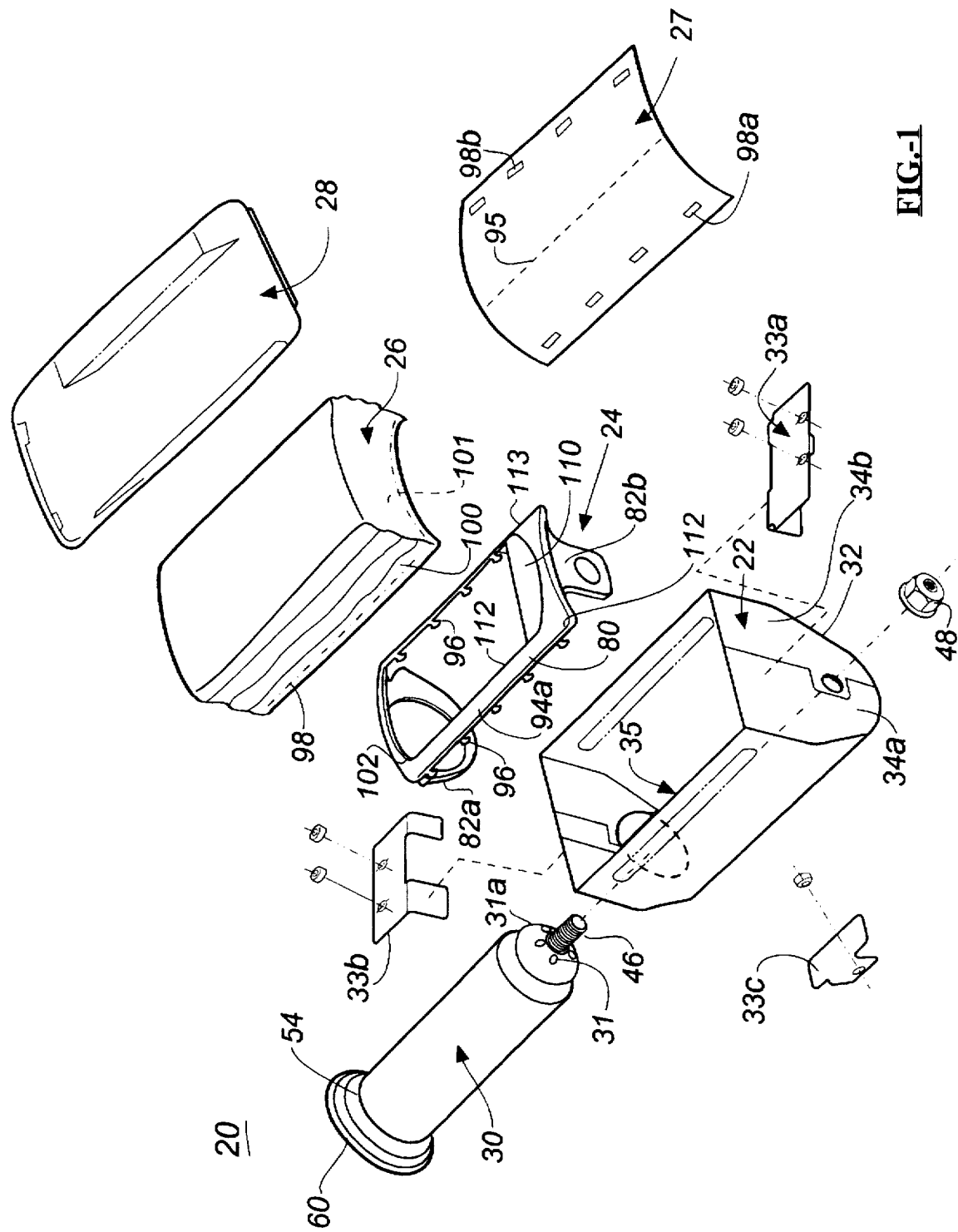
FIG. 1 is an assembly view showing the major components of the present invention.

Reference is made to FIG. 1 which illustrates an assembly view of a passenger side air bag module 20 comprising a housing 22, a retainer/diffuser member 24, an air cushion 26, a hinged cover 28 and an inflator or gas generator 30.

Housing 22 includes a main body 32 comprising first and second half sections 34a and 34b, which are shown in greater detail in FIGS. 2a–2d, 3 and 4a–d.

A typical air bag housing is comprised of an open mouthed, U-shaped main body that is typically closed (on its ends) by mating end caps. The main body and end caps are welded to one another to prevent leakage of inflation gas therethrough. In the present invention, the housing 22 is constructed of two, deep-drawn housing half sections 34a and 34b. This construction has been shown to provide for a more efficient seal.

Figure 2C:
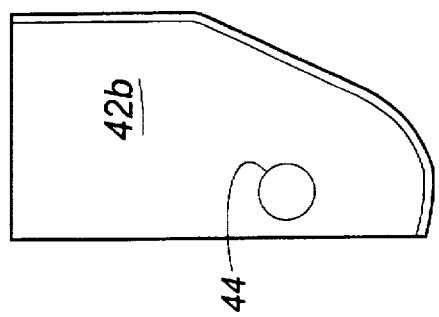
FIGS. 2a–2d show a left plan view, a top view, a right end plan view and a frontal view of a half section of an air bag housing.
Figure 2B:
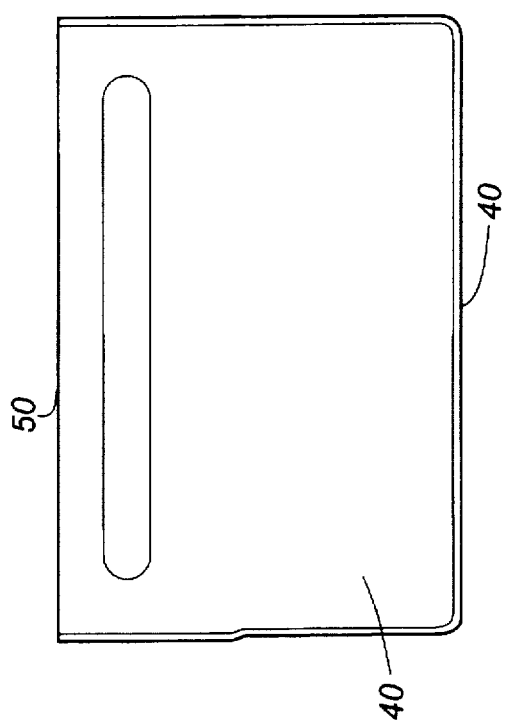
Figure 2D:
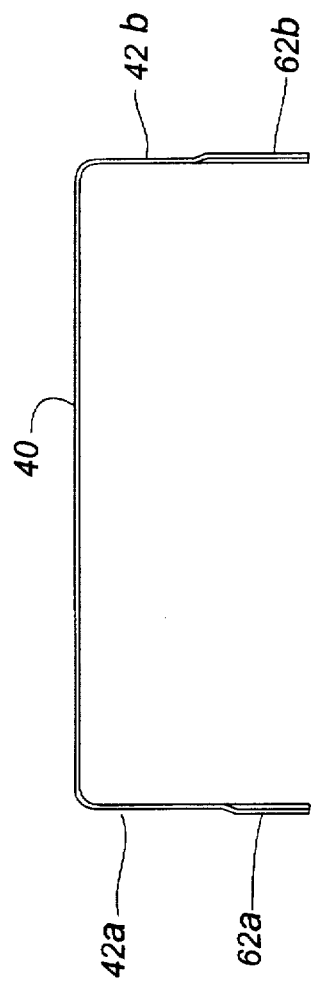
Figure 2A:
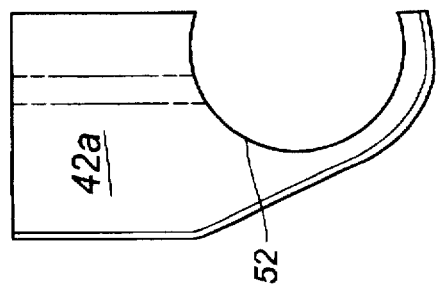
Figure 3:
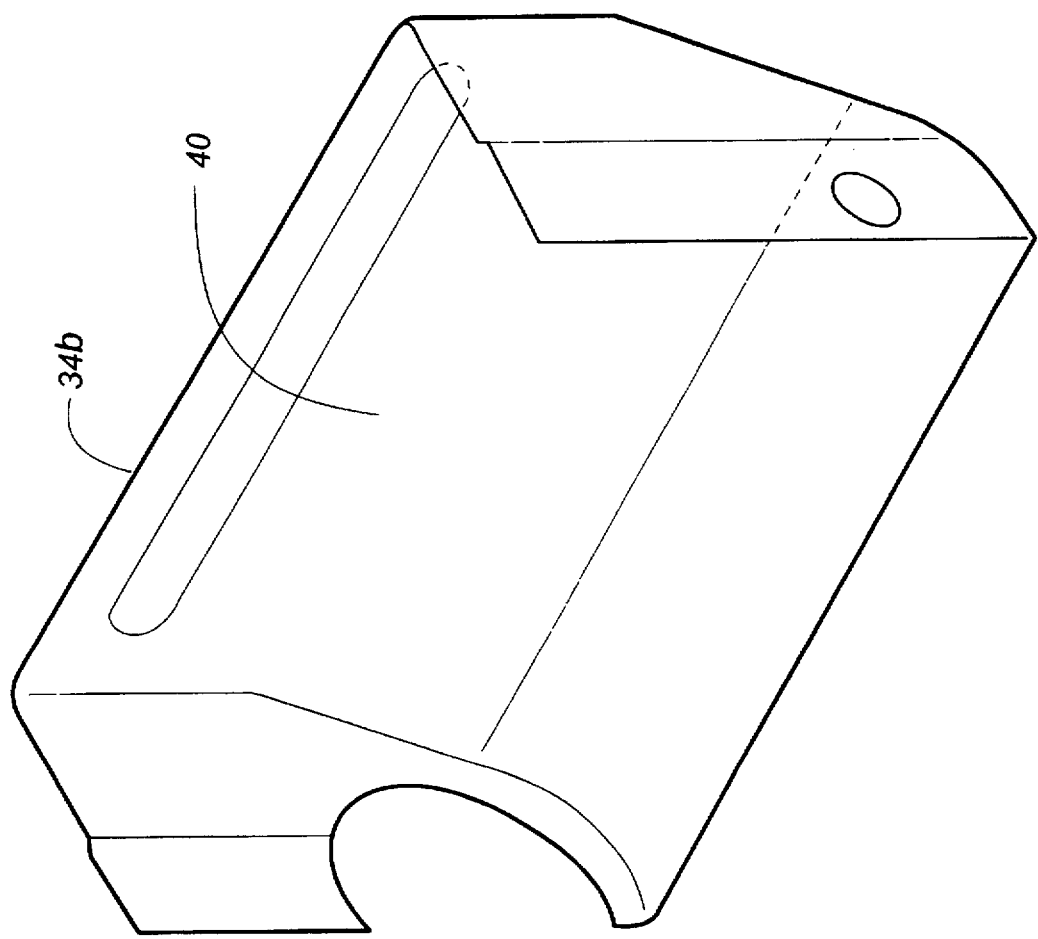
FIG. 3 is an isometric view of a section half.
Figure 4C:
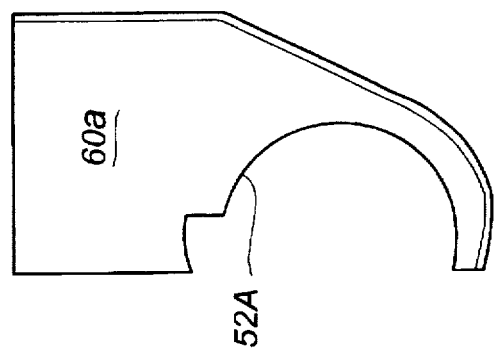
FIGS. 4a–4d show a right plan view, a frontal view, a left end plan view and an isometric view of another housing section.
Figure 4B:
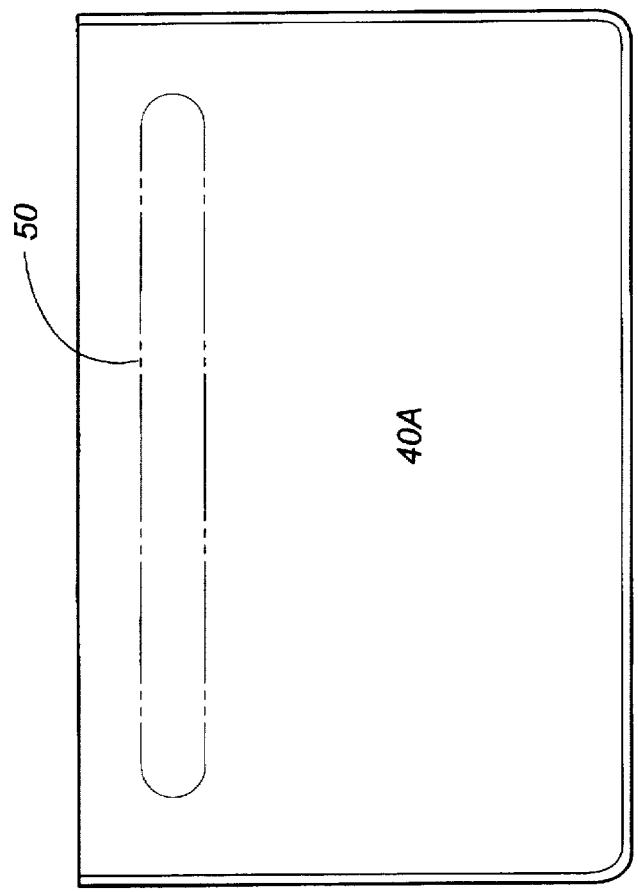
Figure 4A:
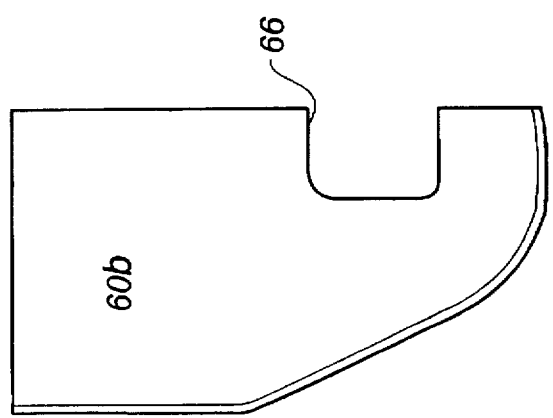
Figure 4D:
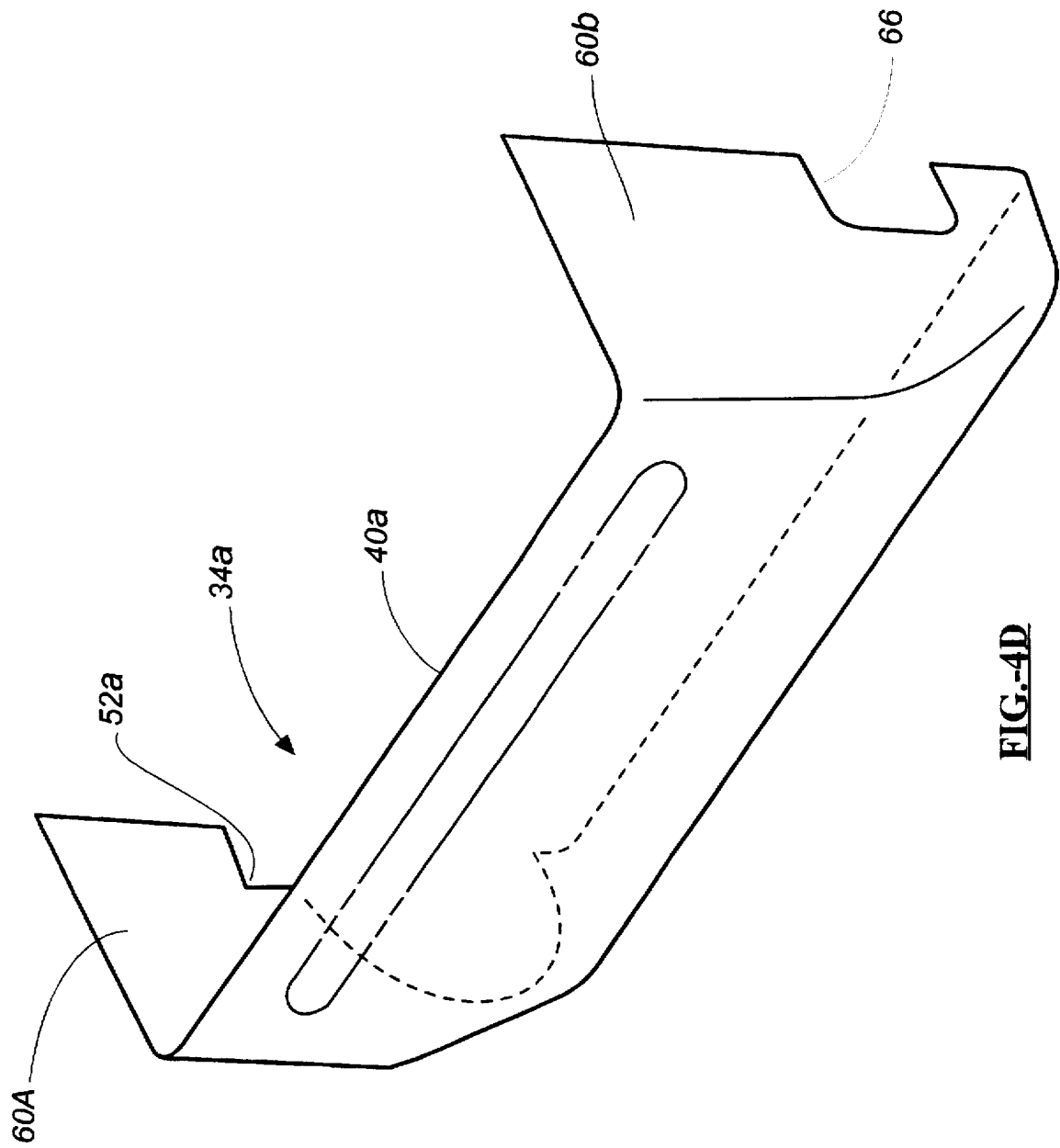

Reference is made to FIGS. 2a–2d and FIG. 3 which illustrate various views of housing half section 34b. Housing half section 34d is formed from a flat metal plate using a deep-drawn process to the configuration shown in FIG. 3. The housing section 34b includes a side wall 40, and end walls 42a and 42b. FIG. 2a is a plan view of end wall 42a, while FIG. 2c is a plan view of end wall 42b. End wall 42b includes an opening 44 through which is received a threaded stud 46 that extends from end 31a of inflator 30 (see FIG. 1) which is secured to the completed housing 32 by a threaded fastener such as nut 48. Side wall 40 is formed with a strengthening rib 50. End wall 42 includes a large generally semi-circular cutout or opening 52. When the inflator 30 is in place within the housing 32 an end 54 of the inflator is positioned within the opening 53 formed by the semi-circular cutout 52 and a mating cutout 52a of housing part 34a. An O-ring seal 60 is received about end 54 of inflator 30 to provide for a more efficient seal between the inflator and the opening 53.

Figure 6:
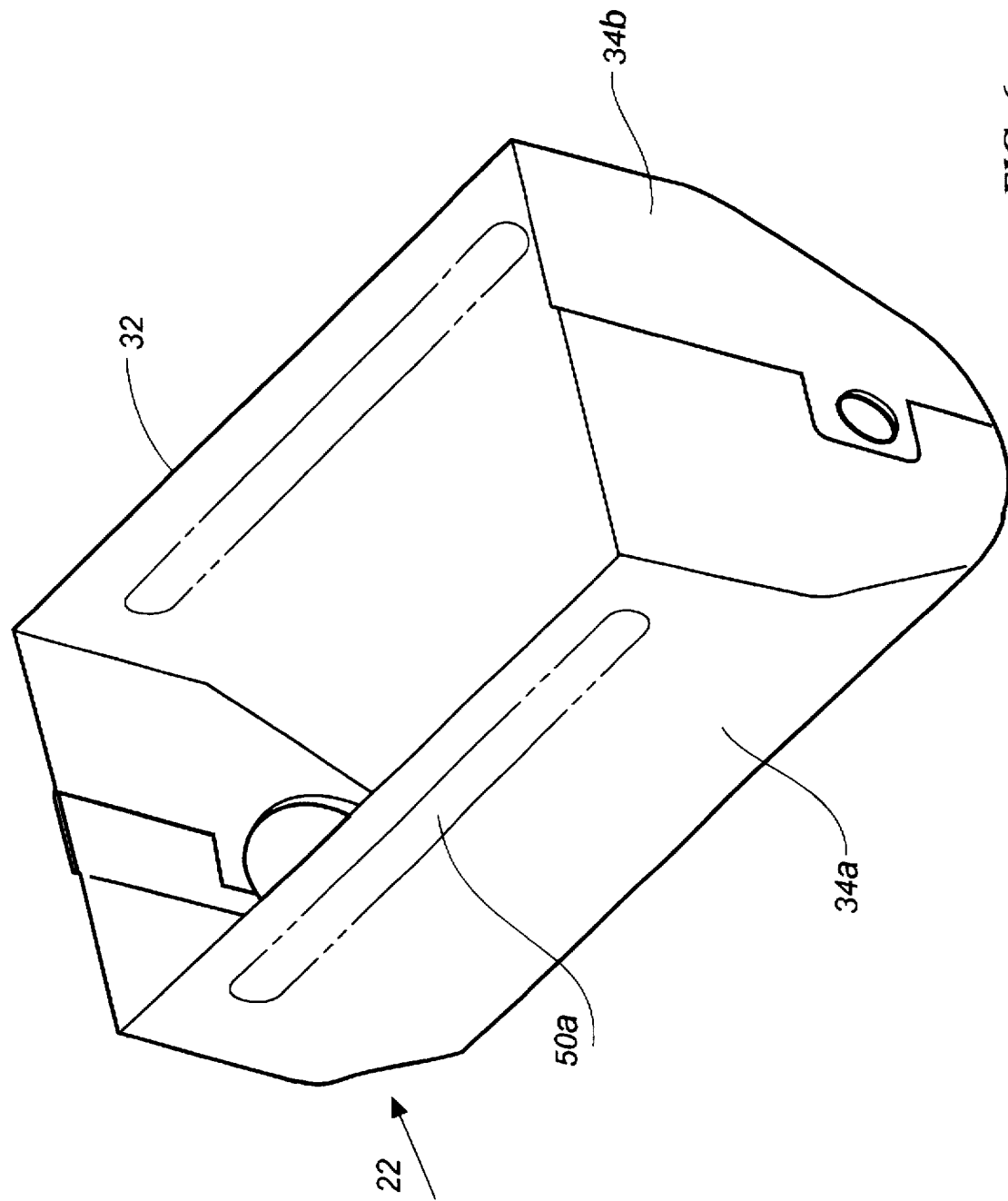
FIG. 6 is an isometric view of the assembled housing.

Reference is briefly made to FIGS. 4a–d which illustrate various views of housing section or section 34a which is generally a mirror image of the housing section 34b. Housing section 34a includes side wall 40a and end walls 60a (having the cutout 52a) and 60b (having a rectangular cutout 66). FIGS. 5a–c illustrate plan views of the assembled housing 32. As can be seen, the ends 60a and 60b of w housing half 34a are generally flat and fit within L widened portions 62a and 62b of housing ends 42a and 42b. The bottoms 64a and 64b of housing halves of 34a and 34b are designed such that they overlap one another upon assembly of the two halves together. With the various housing halves assembled, the plurality of overlapping housing parts are welded together, yielding the configuration of the housing 32 shown in FIG. 6. As can be seen from FIG. 5c, the end wall 58b includes a cutout 66 which provides access to aperture 44 in housing half 34d. As can be seen from FIGS. 4 and 6, the housing section 34a also includes a strengthening rib 50a.

Figure 7C:
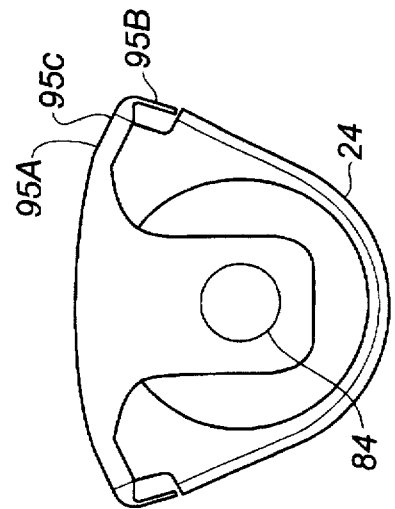
FIGS. 7a–7e illustrate various views of a retainer/diffuser member. In particular
Figure 7B:
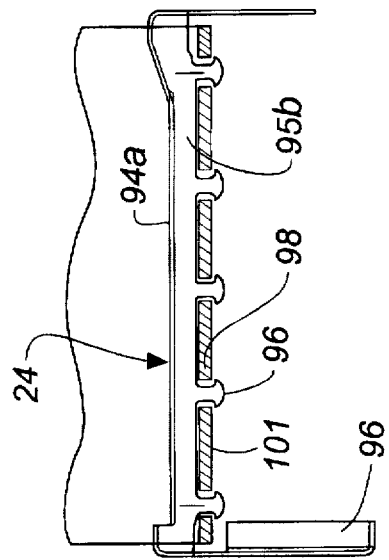
Figure 7A:
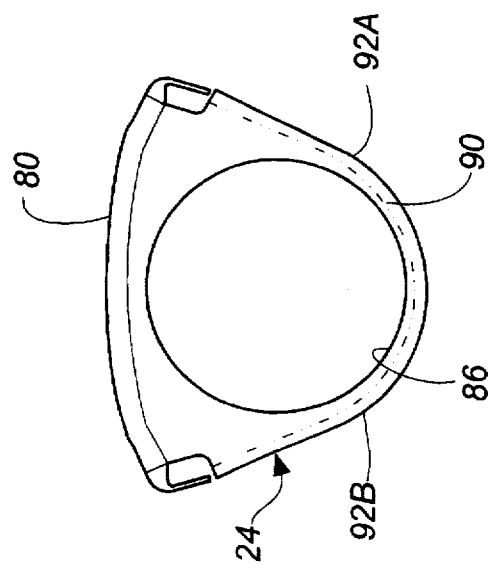
Figure 7D:
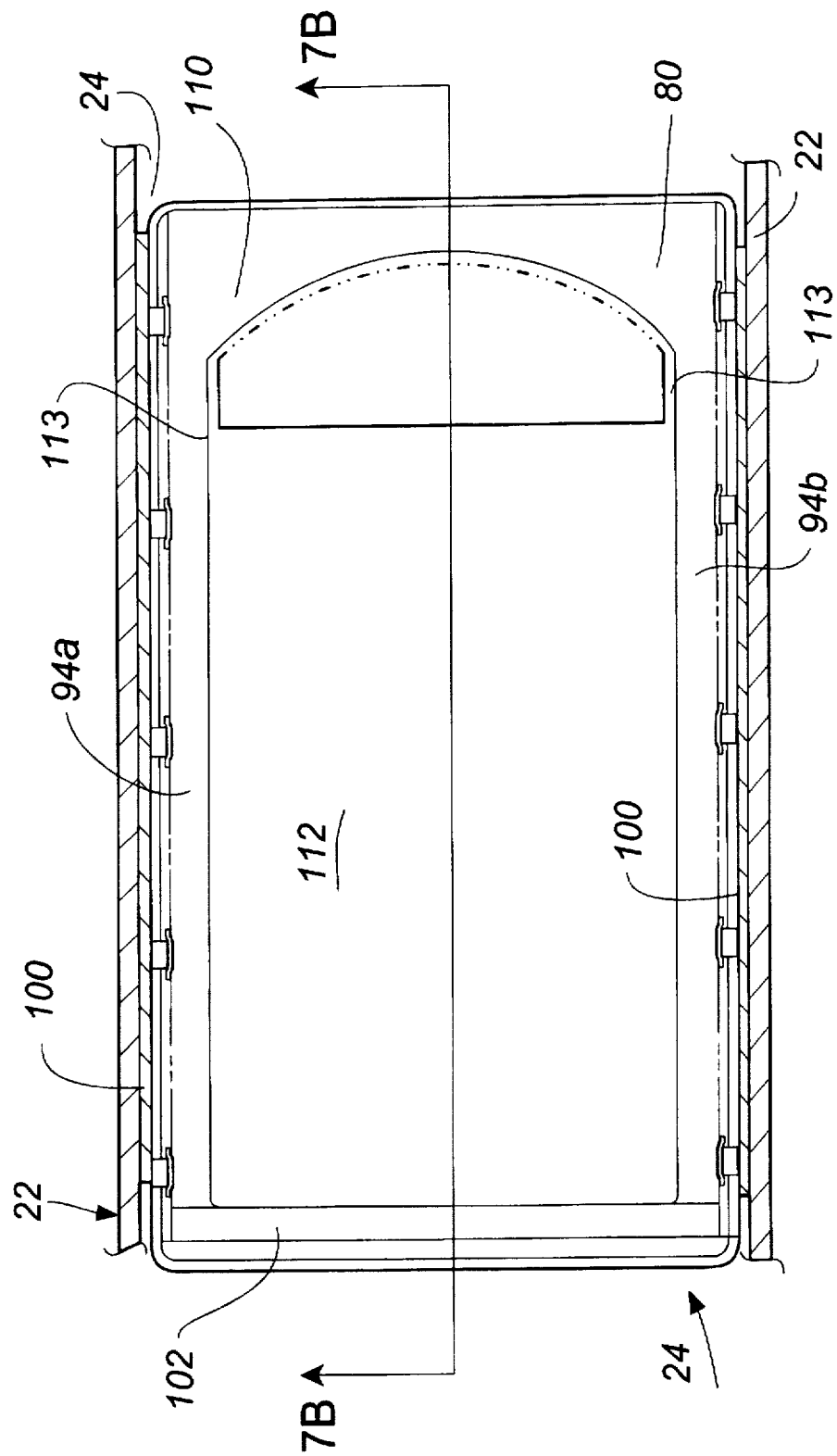
Figure 7E:
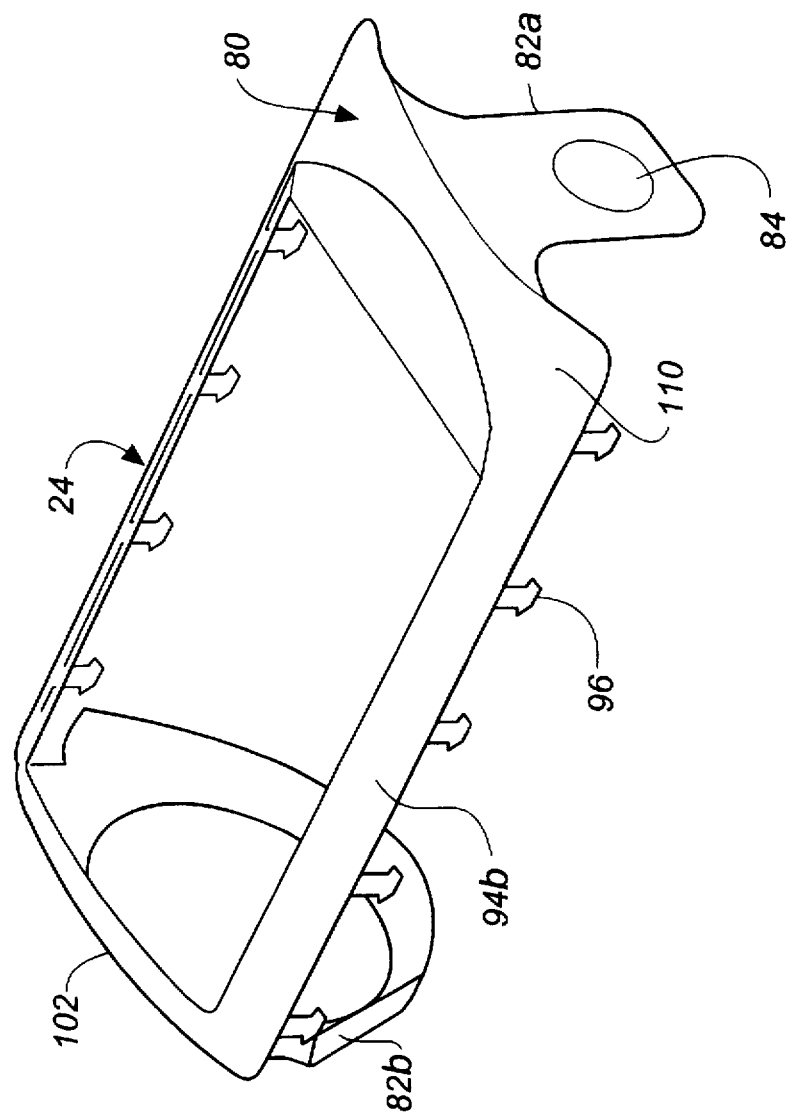

Reference is again made to FIG. 1 and to FIGS. 7a–7d which illustrate further details of the retainer/diffuser 24. The retainer/diffuser 24 is a stamped, preferably metal, part having a top 80 and two depending, bent over, ends 82a and 82b. End 82b is formed as a bent flange having an opening 84 which is substantially the same size as opening 44 of the housing 32. FIG. 7e is an isometric view of the diffuser 24. End 86a includes an opening 86 substantially the same size as the opening 53 which is achieved when the housing halves 34a and 34b are joined together. End 82a also comprises a bent-over flange which includes a strengthening ring 90 which extends approximately from numeral 92a–92b (see FIG. 7a). The top 80 is curved and includes side portions 94a and 94b. Each side portion includes a first (tilted or generally horizontal) portion 95a, a vertical portion 95b and a curved transition portion 95c. Extending from each side 94a and 94b (actually each corresponding vertical portion 95b) are a plurality of retaining hook members 96 which are adapted to fit within a corresponding opening or slit 98 (see FIG. 1) formed in the neck portion 100 of the air cushion 26. As illustrated these hook members include a point and barb to facilitate the retention of the air cushion 24. The top 80 further includes a first top end portion 102 joining sides 94a and b and positioned above end 82b and a second top end portion 110. This second top end portion 110 comprises a baffle plate that is bent downwardly approximately 10 to 25 degrees, preferably 15 degrees to divert inflation gas into an opening 112 formed by the sides 94a and b and top end portions 102 and 110. As can be seen (see FIG. 1), the end 110 is separated from sides 94a and b by slots 113 that are formed while the diffuser/retainer 24 is initially stamped from a flat plate.

Reference is again made to FIG. 1. As can be seen, the inflator 30 includes a plurality of openings 31 situated near the right-hand end of the inflator that supports the threaded stud 46. Further, as can be seen from FIG. 1, the assembled housing 32 includes a plurality of end mounting flanges 33a and 33b extending from its ends and a side mounting flange 33c. As is known in the art, the various mounting flanges will be attached to cooperating structural components typically located beneath the instrument panel (not shown) of the vehicle.

During assembly, the opening 101 of the neck 100 of the air cushion 22 is circumferentially positioned about the retainer/diffuser 24 and the various slits 98 are fitted about the retaining hooks 96 thereby securing the air cushion to the retainer. As can be appreciated, in this configuration the neck of the air cushion is located between the housing 32 and the retainer/diffuser 26. The air cushion 24 is thereafter folded into a compact configuration. This configuration may be maintained by installing a thin, lightweight flexible retaining element, such as 27, about the folded air cushion. As can be seen from FIG. 1, this flexible retaining element 27 may have a plurality of openings 98a corresponding to the number of retaining hooks 96 and a frangible tear line 99. With the air cushion in the folded condition, the various openings 98a are received about a first set of the retaining hooks 96 and thereafter a second set of openings 98b are received about the opposite set of openings 96, thereby retaining the bag in its folded configuration. Alternatively, after the retainer/diffuser 24 and the folded air cushion 26 are received within the housing 32, the housing can be sealed with a thin, adhesive sheet secured to the sides 40 and 40a of the housing parts 34a and 34b respectively.

The diffuser/retainer assembly 24 with the air cushion 26 thereon is inserted into the open mouth of the housing 32 with openings 84 and 86 in alignment with openings 44 and 50,52 of the housing 32. The inflator 30 is inserted within opening 53 and positioned such that the stud 46 extends through opening 44. As the nut 48 is tightened the 0-ring 60 forms a seal between end 54 and opening 53.

Figure 8:
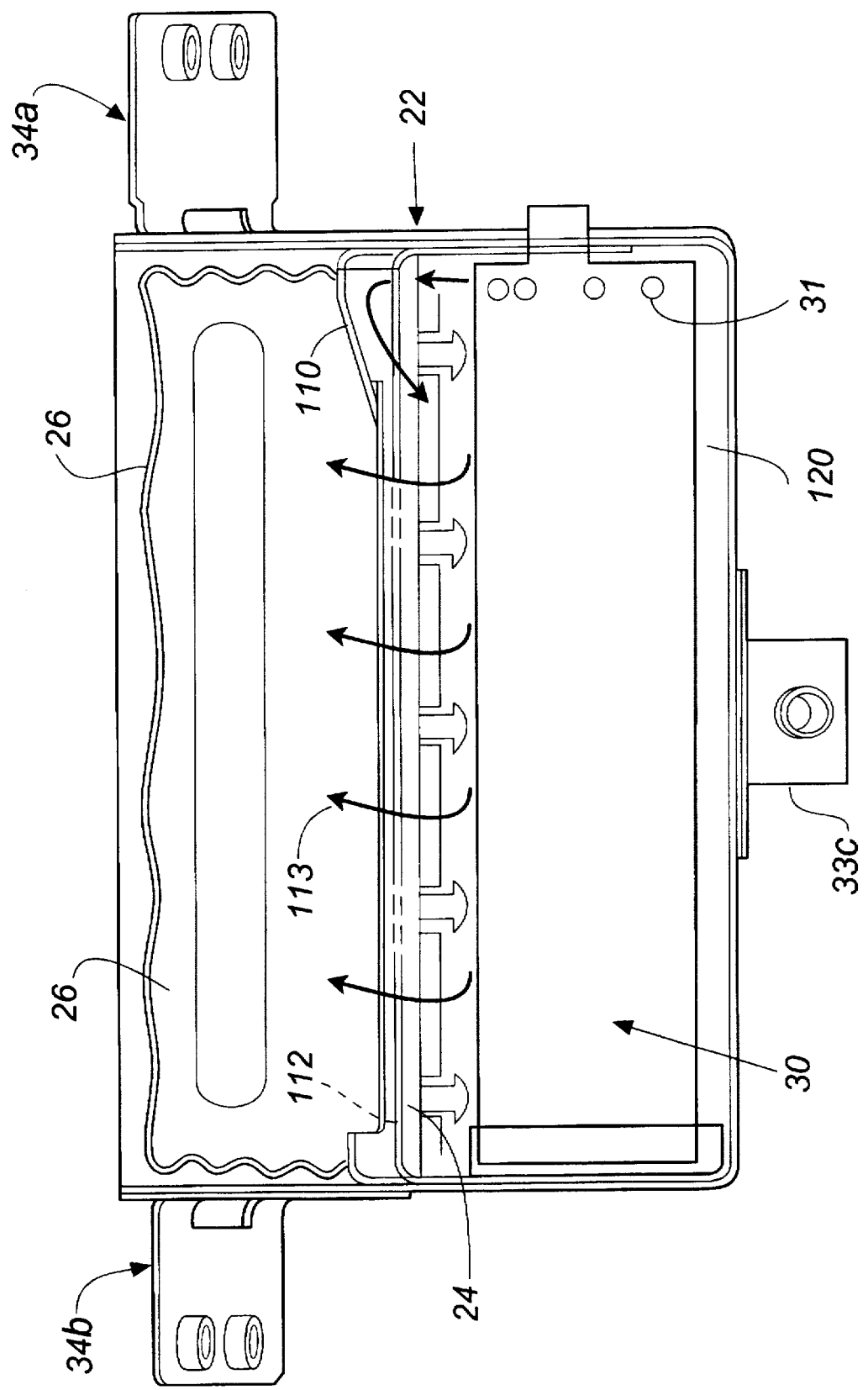
FIG. 8 illustrates a cross-sectional view of an assembled housing.

As can be seen in FIG. 8, the exhaust ports or openings 31 of the inflator are generally positioned below the diffuser 110 of the retainer/diffuser 80.

Upon energization of the inflator 30 in response to a crash signal generated by a crash sensor and cooperating electronic control unit, inflation gas exits the inflator through the exit ports 31. Those exit ports 31 positioned immediately below the retainer 110 will permit the inflation gas to flow vertically upward, hit the L baffle plate 110 and be redirected out of the opening 112 (see arrows 113). If the inflator includes other exit ports positioned proximate the sides or bottom of the housing, then upon energization of the inflator, inflation gas will similarly flow out of these exit ports, impact the housing and be diverted to the left (as seen in FIG. 1) and thereafter such inflation gas will flow about the space 120 between the retainer and the housing and flow out of the opening 112 to fill the air cushion. Further, as the housing 32 is pressurized the internal pressure acts on the sides 94a and 94b of the retainer/diffuser 24 urging same outwardly sandwiching the air cushion tightly against the housing side walls.

One of the benefits achieved by the present invention is that even though the inflator may include its exit ports positioned proximate one end, such as typically is the case with using a hybrid inflator, the inflation gas flow through the opening 112 and into the air cushion 26 will generally be uniform. This uniform gas flow is achieved by redirecting the gas flow along the inflator body before it enters into the air cushion. The gas flow is redirected by the baffle plate that is bent downward. The angle of the baffle plate can be tailored to achieve a desired gas flow into the cushion.

Finally, if the module 20 includes a deployment cover 28, this cover 28 may be attached to one of the sides 40 or 40a of the housing 32. Alternatively, the cover may be spaced from the housing if it is installed as an integral part of an instrument panel.

Many changes and modifications in the above described embodiment of the invention can, of course, be carried out without departing from the scope thereof. Accordingly, that scope is intended to be limited only by the scope of the appended claims.

We claim:

1. An air bag module comprising:
   a housing;
   an air cushion having a neck portion with a plurality of slits;
   an inflator for inflating the cushion having a body and at least one exit port through which inflation gas flows;
   a gas diffuser-retainer having a plurality of retention tabs, the diffuser-retainer cooperating with the body of the inflator for retaining the gas diffuser-retainer to the housing the air cushion is attached to the diffuser-retainer by the retention tabs inserted through the slits wherein during deployment of the air cushion the gas diffuser-retainer retains the air cushion in the module.

2. An air bag module comprising:
   a housing;
   an air, cushion having neck portion with a plurality of slits;
   an inflator for inflating the cushion having a body and at least one exit port through which inflation gas flows;
   a gas diffuser-retainer utilizing the body of the inflator to retain the gas diffuser-retainer to the housing, the air cushion is attached to the diffuser-retainer retainer by retention tabs inserted through the slits where during deployment of the air cushion the gas diffuser-retainer retains the air cushion in the module;
   wherein the gas diffuser-retainer includes a baffle plate located above the exit port of the inflator for diverting the flow of the inflation gases, the gas diffuser-retainer having a passage through which the inflation gas pass into the air cushion.

3. The device as defined in claim 1 wherein the housing utilizes a clam shell construction comprising a first and a second half section which are made from sheets of steel and formed by a deep-draw process, the housing sections are joined together to form the housing, each housing section includes opposing ends having cutouts, such that when the two housing sections are joined an opening is formed to receive the inflator.

4. The device as defined in claim 2 wherein the inflator includes a plurality of exit ports some of which are located generally below the baffle plate.

5. An air bag module comprising:
   a housing;
   an air cushion;
   an inflator for inflating the cushion having a body and at least one exit port through which inflation gas flows;
   a gas diffuser-retainer including a baffle plate located above the exit port of the inflator for diverting the flow of the inflation gases, the gas diffuser-retainer having a passage through which the inflation gas passes into the air cushion.

6. The device as defined in claim 5 wherein the inflator cooperates with the gas diffuser-retainer to retain the gas diffuser-retainer to the housing.

7. The device as defined in claim 2 wherein the housing utilizes a clam shell construction comprising a first and a second half section which are made from sheets of steel and formed by a deep-draw process, the housing sections are joined together to form the housing, each housing section includes opposing ends having cutouts, such that when the two housing sections are joined an opening is formed to receive the inflator.

8. The device as defined in claim 5 wherein the air cushion includes a neck portion with a plurality of slits and wherein the gas diffuser-retainer includes side portions and end portions, each side portion including depending retention tabs, the air cushion being attached to the diffuser-retainer solely by the retention tabs inserted through the slits.

9. The device ad defined in claim 8 wherein the diffuser-retainer further includes opposing end portions, each end portion including an opening through which a portion of the inflator is received to retain the gas diffuser-retainer to the housing.

10. The device as defined in claim 8 wherein with the air bag secured by the retention tabs, the neck of the air bag is positioned between the diffuser-retainer and the housing.

\* \* \* \* \*